March 17, 1936.  R. J. MacKENZIE  2,034,349
CONNECTION FOR TUBULAR MEMBERS
Filed Nov. 27, 1934

INVENTOR.
Roy J. MacKenzie
by Parker, Pinchnow & Harmer
ATTORNEYS.

Patented Mar. 17, 1936

2,034,349

UNITED STATES PATENT OFFICE 2,034,349

CONNECTION FOR TUBULAR MEMBERS

Roy J. MacKenzie, Buffalo, N. Y., assignor to Buffalo Pressed Steel Company, Buffalo, N. Y.

Application November 27, 1934, Serial No. 754,944

8 Claims. (Cl. 285—140)

This invention relates to improvements in means for securing together or coupling tubular members, and particularly to devices of this kind for detachably connecting such members.

The objects of this invention are to provide an improved connection between two tubular members, in which one of the tubular members is provided at its end with a flaring portion which cooperates with a flange and with a portion of the other tubular member to form a strong and tight joint; also to provide a connection of this kind in which the turned edge of one of the tubular members also secures a flange in fixed relation to the tubular member; also to improve the construction of connections for tubular members in other respects hereinafter specified.

Figure 1:
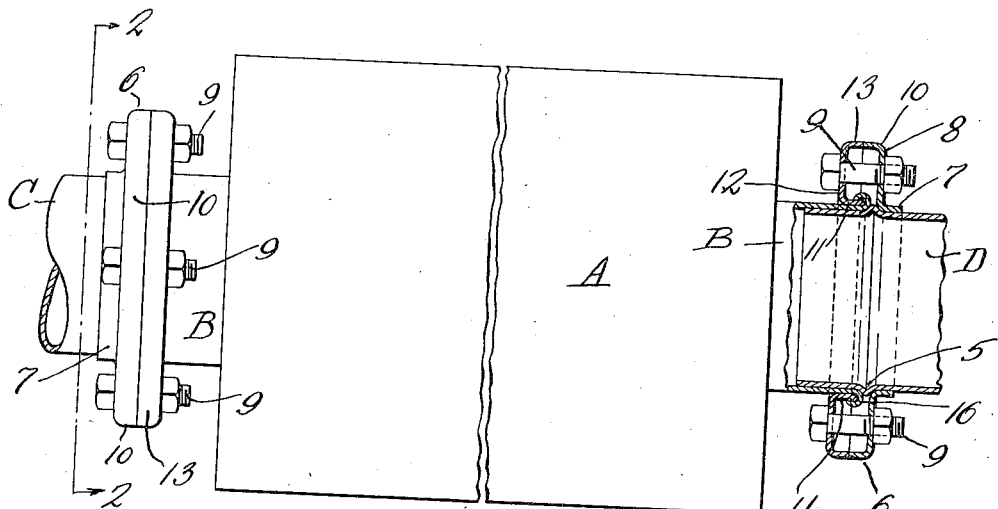
Fig. 1 is a fragmentary longitudinal view of a muffler provided with connections embodying this invention, one of the connections being shown in section.
Figure 2:
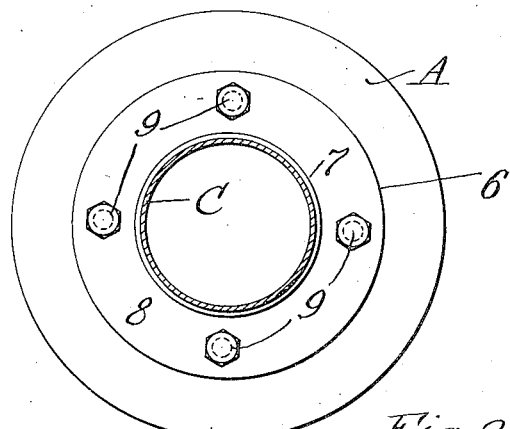
Fig. 2 is an end view of the muffler and the connection, partly in section, on line 2—2, Fig. 1.

In some installations the tail pipe and exhaust pipe have heretofore been secured to the short tubular portions of the muffler head by telescoping the exhaust or tail pipes relatively to the tubular extensions on the muffler heads and by welding a flange on the end portion of the tubular extension of the muffler head. It has been found, however, that during the assembly of automobiles, these welded portions frequently become loosened or broken at the weld, and that consequently the entire muffler must be removed and another one installed in its place. It is also found that these connections between the muffler and tail and exhaust pipes as heretofore made were not always gas tight and did not have sufficient strength.

While my connection is illustrated in the accompanying drawing as used for securing the exhaust and tail pipes to a muffler, it is to be understood, however, that it is not intended to limit the invention to this use, since the same may obviously be used for connecting tubular members for other purposes.

A represents a muffler which may be of any suitable or desired construction, and the opposite heads of which are provided with the usual tubular extensions or portions B, the gases entering into the muffler through one of the tubular extensions and passing out of the same through the other extension. C represents the usual exhaust pipe leading to the muffler and D represents the tail or discharge pipe through which the exhaust gases are discharged from the muffler. These pipes are commonly provided adjacent to their ends with outwardly extending annular ribs or parts, such for example as outwardly pressed beads 5, which serve to limit the extent to which the pipes may be inserted into the tubular extensions of the muffler head and which also serve to form abutments or bearing projections for annular flanges 6 secured to the pipes. These flanges as heretofore commonly employed usually are of substantially Z-shaped cross section, each flange having an inner cylindrical leg or portion 7 adapted to fit around the exterior of the tail or exhaust pipe and to contact with the bead or outwardly extending part 5 which limits the extent to which the flange 6 may move toward the adjacent end of the tail or exhaust pipe. The flange also has a radially outwardly extending portion or web 8 provided with suitable apertures through which the usual flange bolts 9 may extend and the outer end of the flange is again in the form of a cylindrical leg or portion 10. Each tubular extension B of the muffler also has secured thereto a flange which is preferably of channel or U-shaped cross section, having an inner cylindrical leg or portion 11 arranged about the tubular portion B and which heretofore was welded to this portion. This flange also includes a radially extending web or portion 12 having apertures for the bolts 9 and a cylindrical outer leg or portion 13 extending toward and adapted to contact with the cylindrical portion 10 of the other flange.

In accordance with my invention, I provide the outer end of each tubular portion B with an outwardly flaring or beveled portion 14 which engages with an inclined face of the bead 5, and thus contacts with this bead over a more extended surface than when merely an edge of the tubular member B contacts with this bead, as was the case with constructions heretofore used. This flaring or beveled end of the tubular member B also results in a joint having greater structural or mechanical strength than such joints as were heretofore made.

The flange of the tubular member B may be secured thereto in any suitable or desired manner, for example, by welding, as was heretofore done. Consequently even if such welded connection should become broken, the flaring end 14 of the tubular member would still prevent its coupling member from becoming disengaged from the tubular member B. I have found, however, that further improvement in connections of this can be made by utilizing the flaring or beveled end of the outer of the two tubular members for securing a flange thereto, so that welding may be entirely eliminated. Consequently, the cylindrical leg 11 of the flange may abut against the outwardly flaring or turned over portion 14 of the tubular member. Consequently, pressure exerted on this flange by the bolts 9 will act against the part 14, which, being integral with one of the two tubular parts to be connected, will not be broken or damaged by excessive pressure of the bolts 9.

The flaring or beveled portion 14 may be curved outwardly from the cylindrical surface of the tubular member B only to a slight extent, or if desired, the end of the tubular member may be bent or curled over as shown at 16, so that the end of the curled over part contacts with or approaches the outer face of the cylindrical leg 11 of the flange.

Figure 3:
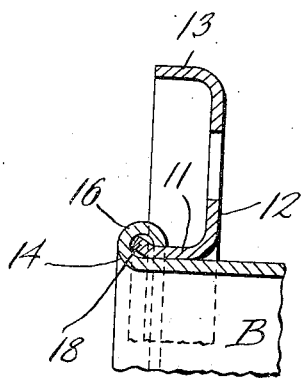
Fig. 3 is a fragmentary sectional elevation on an enlarged scale, of a part of one of the tubular extensions of the muffler and its associated flange.

It will also be noted in reference to Figs. 1 and 3 that the edge portion 18 of the inner cylindrical leg of the flange is flared or bent outwardly with reference to the axis of the flange. Consequently, when the end of the tubular member B is curled over against the end of the cylindrical leg 11 of the flange, the beveled or flaring end 18 acts as a guide to prevent the forming of a sharp or abrupt bend at the juncture of the cylindrical portion of the tubular member with the flared or curled over end, and thus prevents breaking or weakening of the metal at this part of the tubular member, as might happen if the turned over portion 16 were turned against a sharp edge or right-angled corner of the cylindrical part 11 of the flange. This flaring part 18 results in the further advantage of forming at 14 a more gradual inclination or taper, which results in a better wedging action against the outward projection or bead 5 of the other tubular member.

The outwardly flaring part 18 has still another advantage, in that when the curled over portion 16 is formed so that the end of this part engages or approaches closely to the outer surface of the cylindrical leg 11 back of the flaring portion 18, this flaring portion forms with the end of the turned over portion 16 a stop for holding the flange against movement lengthwise of the tubular member away from the outer end thereof. By means of this construction, the flange is consequently secured to the tubular member against movement in either direction lengthwise of the tubular member, but preferably this flange is not held against rotation by the curled over portion 16, so that when connecting the two tubular members, this flange can easily be turned to place the bolt holes therein into registration with the bolt holes in the flange 6.

In the use of the improvements described, the flange 6 cooperates with the bead 5 of the tubular member on which it is arranged in the usual manner. The other flange, when the bolts 9 are tightened, abuts at its outer edge against the outer edge of the flange 6 and at its inner edge is drawn against the flared end 14 of its tubular member, thus drawing this end against the bead 5 of the other tubular member. Even if the bolts are excessively tightened, this latter flange cannot become broken from its tubular member and draws the gradually tapered or inclined annular portion 14 against the correspondingly tapered side of the bead or projection 5, thus forming a connection which is of very rigid mechanical structure, and which forms a gas tight seal between the two tubular members. In case excessive pressure is exerted by the bolts 9, it will be noted that such pressure would have a tendency to bend the outwardly flared portion 14 back toward its original cylindrical form, this being particularly the case because of the beveled or inclined end 18 of the flange, and such deformation of the flared portion 14 would tend to draw the same still more closely into contact with the bead or projection 5. It will also be noted that this tendency to bend back the flaring portion 16 will be opposed not only by the metal of this flaring portion, but also by the bead or projection 5, thus greatly increasing the resistance of the end of the tubular member B to rupture.

Another advantage of my improved connection is that in flaring or rolling over the end of a tubular member, it is customary to place the tubular member into an accurately machined jig or fixture, so that the rolling or flaring over of the end of the tubular member can be accomplished with greater accuracy than the cutting of the end of this member. Also if the end of the tubular member is curled over against the flange, then both the tubular member and the flange are held in the jig or fixture during rolling of the end of the tubular member, so that the flange will also be secured with a high degree of accuracy to the tubular member. Such accuracy cannot readily be obtained when welding the flange to the tubular member.

I claim as my invention:

1. A joint between a tubular extension of a muffler head and a pipe adapted to telescope into said tubular extension and having an outwardly projecting bead formed thereon to limit the extent to which said pipe may telescope into said tubular extension, a flange on said pipe engaging one side of said bead, a turned over portion formed on the end of said tubular extension and adapted to engage the other side of said bead, a second flange surrounding said tubular extension and engaging said turned over portion, said second flange having a cylindrical portion engaging said tubular extension, the end of said cylindrical portion being flared outwardly with reference to the axis of said tubular extension, and said turned over portion extending over said flaring portion of said flange to hold said flange in fixed relation to said tubular extension, and means for drawing said flanges toward each other.

2. A joint between a tubular extension of a muffler head and a pipe adapted to telescope into said tubular extension and having an outwardly projecting bead formed thereon at a distance from the end thereof which enters said tubular extension, to limit the extent to which said pipe may telescope into said tubular extension, a flange on said pipe engaging one side of said bead, an outwardly turned portion formed on the end of said tubular extension and adapted to engage the other side of said bead, a second flange surrounding said tubular extension and engaging said outwardly turned portion, said second flange having a cylindrical portion arranged about said tubular extension and having its outer edge arranged adjacent to the outer end of said tubular extension and flaring outwardly with reference to the axis of said tubular extension, said outwardly flaring portion engaging said outwardly turned portion of said tubular extension to form an extended tapering bearing surface to press said outwardly turned portion against said bead, and means for drawing said flanges toward each other.

3. A joint between two tubular members, one of which telescopes within the other, an outwardly extending projection formed on the inner of said two tubular members, a flange secured to said inner tubular member, a second flange of substantially channel-shaped cross section arranged about the outer of said tubular members and having a substantially cylindrical inner leg with its outer end flaring outwardly and arranged in contact with said outer tubular member and having its free edge extending toward the end of said outer tubular member, the end portion of said outer tubular member being turned over the flaring end of said cylindrical portion of said second flange to hold said second flange against movement toward the end of said outer tubular member and to form a tapering seat for said projection of said inner tubular member, and means for drawing said flanges toward each other.

4. A joint between two tubular members, one of which telescopes within the other, an outwardly extending projection formed on the inner of said two tubular members, a flange of substantially channel-shaped cross section arranged about the outer of said tubular members and having a substantially cylindrical inner leg arranged in contact with said outer tubular member and having its free edge extending toward the end of said outer tubular member and flared outwardly, the end of said outer tubular member being turned over said flaring end of said flange to hold said second flange against movement lengthwise of said outer tubular member both toward and from said end thereof, and means for drawing said flange and said inner tubular member toward each other.

5. A muffler provided with a head having a tubular extension adapted to receive a pipe having a bead formed thereon to limit the extent to which said pipe may telescope into said extension, said tubular extension having its outer end turned over, a flange arranged about said tubular extension and having a cylindrical portion arranged in contact with said tubular extension and having its outer end flared outwardly and extending into said turned over portion of said tubular extension and held thereby against movement in either direction lengthwise of said tubular extension.

6. A joint between a tubular extension of a muffler head and a pipe adapted to telescope into said tubular extension and having an outwardly projecting bead formed thereon to limit the extent to which said pipe may telescope into said tubular extension, a flange on said pipe, the end of said tubular extension being flared outwardly and adapted to engage a side of said bead, a second flange surrounding said tubular extension and secured against movement lengthwise thereof in either direction, and means for drawing said flanges toward each other.

7. A joint between a tubular extension of a muffler head and a pipe adapted to telescope into said tubular extension and having an outwardly projecting bead formed thereon to limit the extent to which said pipe may telescope into said tubular extension, a flange on said pipe, the end of said tubular extension being flared outwardly and adapted to engage a side of said bead, a second flange surrounding said tubular extension and secured against movement lengthwise thereof in either direction, and adjustable circumferentially about said tubular extension, and bolts connecting said flanges.

8. A connection between two tubular members, one of which has an annular outwardly projecting part on its outer periphery adjacent to the end portion thereof, a second tubular member having its outer end turned over outwardly, said turned over portion being adapted to engage said projecting part of the first tubular member, a flange for said second tubular part and having its outer end flared outwardly and engaging said turned over portion, said turned over portion extending about said outwardly flaring end of said flange for holding said flange against lengthwise movement in either direction relatively to its tubular member but permitting adjustment of said flange about the axis of its tubular member, and means associated with said flange and said other tubular member for drawing said projecting part and said turned over parts of said tubular members together.

ROY J. MacKENZIE.